United States Patent
Kang

(10) Patent No.: US 11,297,293 B2
(45) Date of Patent: Apr. 5, 2022

(54) ELECTRONIC DEVICE AND CONTROL METHOD THEREOF

(71) Applicant: SAMSUNG ELECTRONICS CO., LTD., Suwon-si (KR)

(72) Inventor: Jinsung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/012,341

(22) Filed: Sep. 4, 2020

(65) Prior Publication Data

US 2021/0092340 A1 Mar. 25, 2021

(30) Foreign Application Priority Data

Sep. 23, 2019 (KR) .................... 10-2019-0116932

(51) Int. Cl.
  *H04N 9/64* (2006.01)
  *H04N 7/015* (2006.01)
  *H04N 5/57* (2006.01)
  *H04N 5/445* (2011.01)
  *H04N 7/04* (2006.01)
  *H04N 5/20* (2006.01)
  *H04N 7/10* (2006.01)

(52) U.S. Cl.
  CPC ............... *H04N 9/646* (2013.01); *H04N 5/20* (2013.01); *H04N 5/445* (2013.01); *H04N 5/57* (2013.01); *H04N 7/0157* (2013.01); *H04N 7/04* (2013.01); *H04N 7/102* (2013.01); *H04N 9/643* (2013.01)

(58) Field of Classification Search
  CPC .......... H04N 5/775; H04N 5/765; H04N 5/20; H04N 5/445; H04N 5/57; H04N 7/0157; H04N 7/04; H04N 7/102; H04N 9/643; H04N 9/646
  USPC ....... 348/552, 672, 645, 649, 607, 687, 699, 348/700, 703, 714, 718, 719; 386/335, 386/353, 200, 218, 219, 230, 231; 725/98, 117, 118, 141, 142, 148
  See application file for complete search history.

(56) References Cited

U.S. PATENT DOCUMENTS

2005/0232581 A1* 10/2005 Karasawa ................ H04N 5/14
                                          386/230
2014/0059169 A1*  2/2014 Ko ...................... G06F 3/04845
                                          709/217
2019/0182141 A1*  6/2019 Shih ..................... H04L 43/0852

* cited by examiner

*Primary Examiner* — Sherrie Hsia
(74) *Attorney, Agent, or Firm* — Sughrue Mion, PLLC

(57) ABSTRACT

An electronic device and a method for controlling the electronic device are provided. The electronic device includes a storage; a display; a communication interface configured to communicate with an external device to receive, from the external device, a video signal including a plurality of frames at a second transmission speed that is faster than a first transmission speed; and a processor configured to: control the communication interface to receive the plurality of frames transmitted at the second transmission speed and store the plurality of frames in the storage, identify features of a second frame among the plurality of frames to be played back after a first frame among the plurality of frames, and control the display to display the first frame based on the identified features of the second frame.

20 Claims, 10 Drawing Sheets

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2019-0116932, filed on Sep. 23, 2019 in the Korean Intellectual Property Office, the disclosure of which is incorporated by reference herein in its entirety.

BACKGROUND

1. Field

The disclosure relates to an electronic device and a control method thereof, and more particularly, to an electronic device for receiving a video signal including a plurality of frames from an external device and a control method thereof.

2. Description of Related Art

Currently, TVs are able to display ultra-high definition (UHD) images in accordance with rapid technology development, meeting demands of users requiring better picture quality. For example, UHD TVs are able to display images that are 16 times clearer than full-HD (FHD) TVs do, based on HD video signals such as 4K 120 Hz and provide users with feeling of movement and sense of realism that they have not experienced.

If a source device transmits an HD video signal to a TV at a predetermined transmission speed, the TV receives the HD video signal at the predetermined transmission speed and plays back the received HD video signal at a predetermined playback speed to display an HD image.

However, when the transmission speed of an HD video signal matches the playback speed of a TV, e.g., the transmission speed is fixed, the TV has limitations in providing better watching environment through HD images because it is limited to play back HD images based on the HD video signals received at the transmission speed. For example, if features of HD images are changed, (e.g., if brightness is drastically increased or decreased while the images are being displayed), a user may feel visual discomfort due to the change in the features of the image. Such visual discomfort results in a drastic decrease in the quality of watching environment and a deterioration of feeling of movement and sense of realism that were intended to be delivered through the HD image.

Accordingly, embodiments of the disclosure provide a method for improving the quality of the watching environment and fully delivering feeling of movement and sense of realism through HD images by transmitting HD video signals at a variable transmission speed.

SUMMARY

In accordance with an aspect of the disclosure, there is provided an electronic device including: a storage; a display; a communication interface configured to communicate with an external device to receive, from the external device, a video signal including a plurality of frames at a second transmission speed that is faster than a first transmission speed; and a processor configured to: control the communication interface to receive the plurality of frames transmitted at the second transmission speed and store the plurality of frames in the storage, identify features of a second frame among the plurality of frames to be played back after a first frame among the plurality of frames, and control the display to display the first frame based on the identified features of the second frame.

The first transmission speed corresponds to a vertical frequency of the video signal.

The processor is further configured to control the communication interface to receive the plurality of frames at the second transmission speed by increasing a clock frequency.

The processor is further configured to determine the second transmission speed, and transmit a request to the external device to transmit the plurality of frames at the determined second transmission speed.

The processor is further configured to adjust features of the first frame to reduce a difference between features of the first frame and the features of the second frame.

Based on at least one frame existing between the first frame and the second frame, the processor is further configured to adjust the at least one frame so that features of the first frame is gradually changed to the features of the second frame.

The processor further configured to adjust the features of the first frame based on a change in features before and after the second frame being a preset value or higher.

The features of each of the plurality of frames includes at least one of brightness, saturation, hue, noise, motion vector, distribution of frequency or histogram.

The processor is further configured to control the display to display information for adjusting a picture quality based on the features of the second frame.

The electronic device further includes a user input interface for receiving a user input. The processor is further configured to receive, through the user input interface, a user input for adjusting the picture quality of the second frame, and control the display to display the second frame with the adjusted picture quality according to the received user input.

In accordance with an aspect of the disclosure, there is provided a control method of an electronic device, the control method including: receiving, from an external device, a video signal including a plurality of frames at a second transmission speed that is faster than a first transmission speed; storing the plurality of frames transmitted at the second transmission speed; identifying features of a second frame among the plurality of frames to be played back after a first frame among the plurality of frames; and displaying the first frame based on the identified features of the second frame.

The first transmission speed corresponds to a vertical frequency of the video signal.

The receiving further includes receiving the plurality of frames at the second transmission speed by increasing a clock frequency.

The control method further includes: determining the second transmission speed; and transmitting a request to the external device to transmit the plurality of frames at the determined second transmission speed.

The displaying the first frame includes adjusting features of the first frame to reduce a difference between features of the first frame and the features of the second frame.

The control method further includes: based on at least one frame existing between the first frame and the second frame, adjusting the at least one frame so that features of the first frame is gradually changed to the features of the second frame.

The displaying the first frame further includes adjusting features of the first frame based on a change in features before and after the second frame being a preset value or higher.

The features of each of the plurality of frames includes at least one of brightness, saturation, hue, noise, motion vector, distribution of frequency or histogram.

The displaying the first frame further includes displaying information for adjusting a picture quality based on the features of the second frame.

In accordance with an aspect of the disclosure, there is provided a non-transitory computer readable recording medium storing a computer program including computer-readable code that performs a control method of an electronic device, the control method of the electronic device including: receiving, from an external device, a video signal including a plurality of frames at a second transmission speed that is faster than a first transmission speed; storing the plurality of frames transmitted at the second transmission speed; identifying features of a second frame among the plurality of frames to be played back after a first frame among the plurality of frames; and displaying the first frame based on the identified features of the second frame.

Additional aspects will be set forth in part in the description which follows, and in part, will be apparent from the description, or may be learned by practice of the presented embodiments.

BRIEF DESCRIPTION OF THE DRAWINGS

The above and other aspects, features and advantages of certain embodiments will become more apparent from the following description, taken in conjunction with the accompanying drawings, in which.

DETAILED DESCRIPTION

Figure 1:
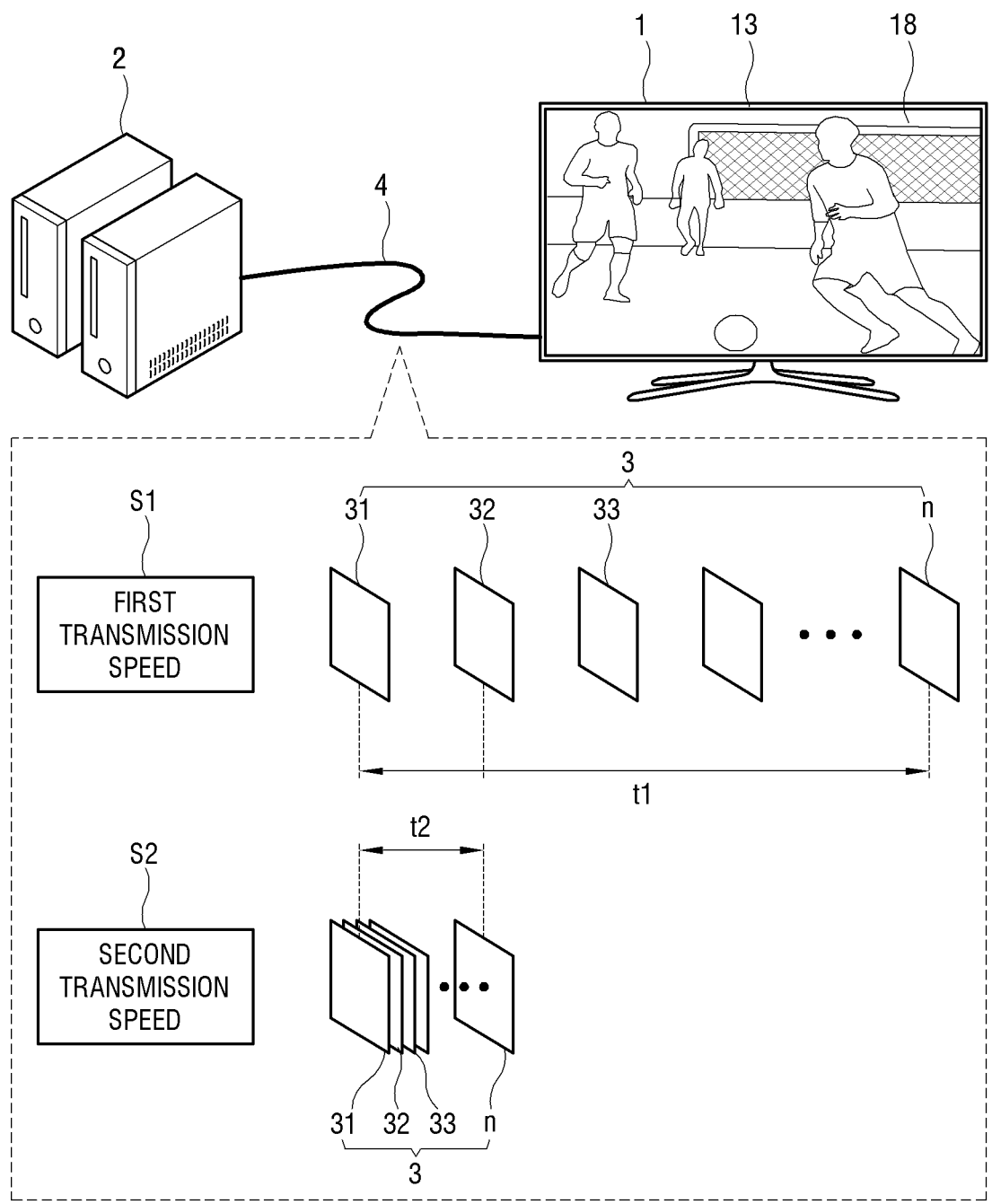
FIG. 1 is a schematic diagram illustrating an electronic device according to an embodiment.

Below, embodiments of the disclosure will be described in detail with reference to accompanying drawings. In the drawings, the like reference numerals or signs denote elements that perform substantially the same functions. In the embodiments of the disclosure, the expression "at least one" of a plurality of elements refers to not only all of the plurality of elements but also each or a combination of the same excluding the remainder of the plurality of elements.

FIG. 1 is a schematic diagram illustrating an electronic device according to an embodiment. As shown in FIG. 1, an electronic device 1 may be implemented as a display apparatus that may display an image based on a video signal. However, the electronic device 1 is not limited to a display apparatus and may include a TV, computer, smart phone, tablet PC, portable media player, wearable device, video wall, electronic frame, etc. In addition, the electronic device 1 may be implemented as an image processing device such as a set-top box that does not include a display. In such case, the electronic device 1 may provide a processed video signal to a display to display an image thereon. However, the electronic device 1 is not limited to the foregoing, and may be implemented as other various types of devices such as home appliances including a refrigerator and a washer, and an information processing device including a computer main body, other than the image processing device including the set-top box. However, for convenience of description, the case where the electronic device 1 is implemented as a TV will be described as an example below.

The electronic device 1 may receive a video signal from an external device 2. If the external device 2 transmits a video signal to the electronic device 1, the electronic device 1 may display an image based on the received video signal. The external device 2 may be a set-top box that provides a video signal, but the external device is not limited thereto. The external device 2 may be also implemented as a portable storage device, blue-ray player, smart phone, tablet PC, PC, electronic frame, server, etc., which may provide a video signal. However, for convenience of description, a set-top box will be used as an example to describe the external device 2.

The electronic device 1 may receive a video signal from the external device 2 through a cable 4. The cable 4 may be in accordance with a high definition multimedia interface (HDMI) 2.1 standard. However, the transmission standard according to the present embodiment is not limited to the HDMI 2.1 standard.

If the cable 4 is in accordance with the HDMI 2.1 standard, a video signal with a high bandwidth of up to 48 Gbps may be transmitted. For example, the external device 2 may transmit HD video signals of 4K 120 HZ, 8K 60 Hz, etc. to the electronic device 1 by utilizing a high bandwidth, and the electronic device 1 may play back HD images of 4K 120 Hz, 8K 60 Hz, etc. based on the HD video signal transmitted through the cable 4.

In particular, the electronic device 1 may receive a video signal at a variable transmission speed by utilizing, for example, Fast Vactive (FVA) function provided by HDMI 2.1 standard. For example, as shown in FIG. 1, the external device 2 may transmit a video signal at a first transmission speed S1 or at a second transmission speed S2 that is faster than the first transmission speed S1. The transmission speed may be represented as the number of frames transmitted per unit time. If a video signal includes an N number of plural frames 3, the external device 2 may transmit the n number of frames per unit time t1 at the first transmission speed S1, or the n number of frames per unit time t2 at the second transmission speed S2. In such case, the second transmission speed S2 may be t1/t2 times faster than the first transmission speed S1.

The electronic device 1 may display an image at a predefined playback speed. The playback speed may be represented as the number of frames displayed per unit time, and may be equal to the first transmission speed S1. According to an embodiment, the first transmission speed S1 and the playback speed being equal may mean that the number of frames transmitted per unit time and the number of frames displayed per unit time are identical to each other. In this case, the electronic device 1 may display the n number of frames, which is the same number as the number of frames transmitted at the first transmission speed S1. If the first transmission speed S1 corresponds to a vertical frequency of a video signal, the electronic device 1 may display the n number of frames at a playback speed corresponding to the vertical frequency of the video signal.

If the electronic device 1 displays the n number of frames at the playback speed that is the same as the first transmission speed S1, i.e., per unit time t1, and if the external device 2 transmits the n number of frames at the second transmission speed S2 that is faster than the first transmission speed S1, i.e., per unit time t2, the electronic device 1 may receive (n×t1/t2) number of frames, which is more than the n number of frames per unit time t1.

That is, the electronic device 1 may receive a video signal at the second transmission speed S2 faster than the playback speed. In such case, the electronic device 1 may store a plurality of frames 3 of a video signal in advance. The electronic device 1 may store a plurality of frames 3 to be played back, and play back a frame based on the plurality of frames 3 stored in advance as described above.

More specifically, the electronic device 1 may identify features of a second frame to be played back after a first frame out of the plurality of frames 3 stored in advance, and may display the first frame based on the identified features of the second frame. Features of a frame may include at least one of brightness, saturation, hue, noise, motion vector, and distribution of frequency and histogram. However, the features of a frame are not limited thereto.

That is, as shown in FIG. 1, the electronic device 1 may store a plurality of frames 3 in advance at the second transmission speed S2, and may identify features of a third frame 33 to be played back after a second frame 32 out of a plurality of frames 3, and may display the second frame 32 based on the identified features of the third frame 33.

If brightness sharply rises or falls between the second frame 32 and the third frame 33, a user may feel visual discomfort due to the sharp change in the brightness, but the electronic device 1 may identify a difference of brightness between the second frame 32 and the third frame 33, which are stored in advance, and may display the second frame 32 based on the identified difference in brightness, thereby mitigating the sharp change in the brightness and preventing visual discomfort.

According to this embodiment, the electronic device 1 displays an image based on the plurality of frames 3 stored in advance, thereby improving the quality of a watching environment and fully delivering the feeling of movement and sense of realism through an HD image.

Figure 2:
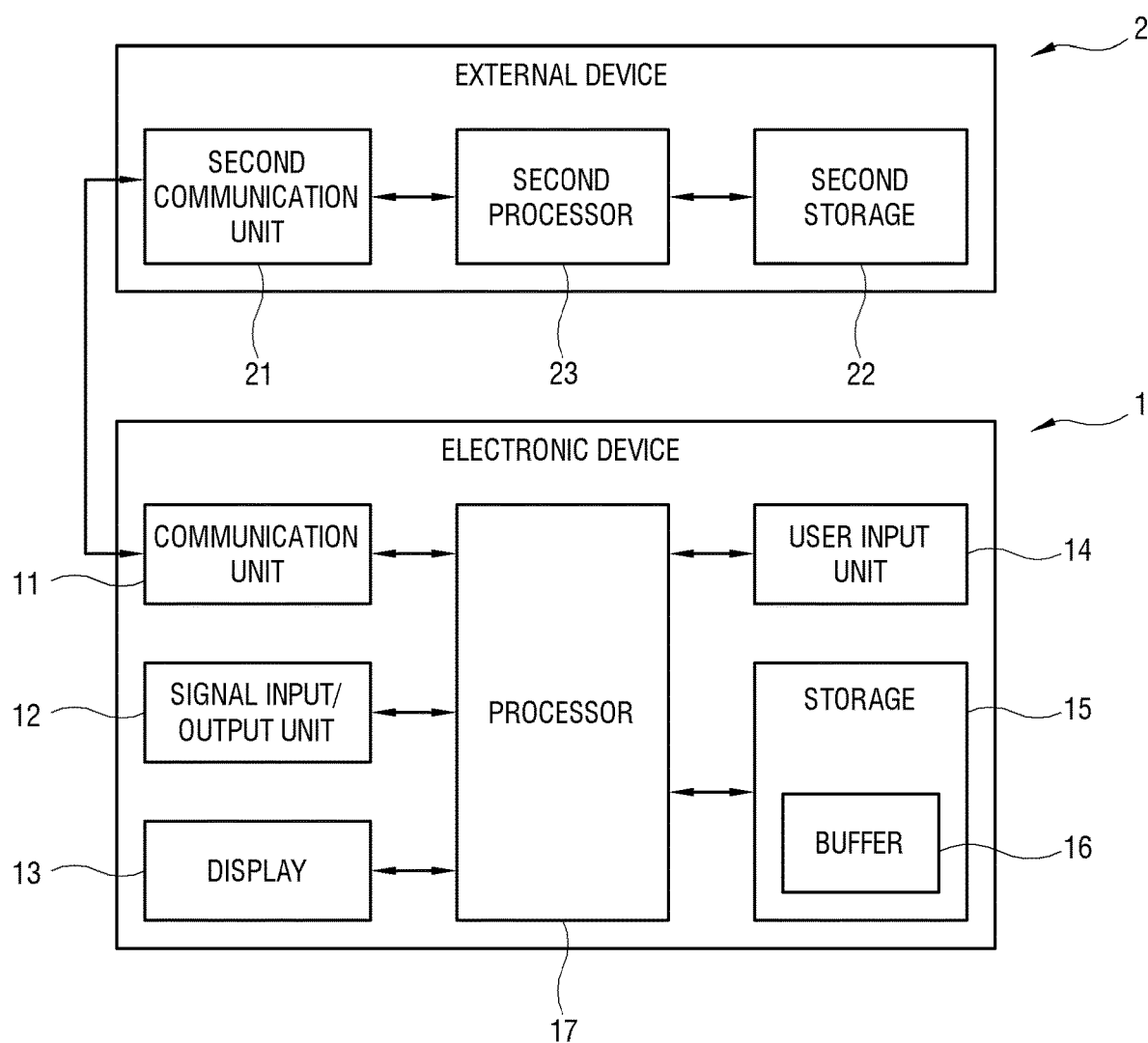
FIG. 2 is a block diagram illustrating an example of a configuration of an electronic device according to an embodiment.

FIG. 2 is a block diagram illustrating an example of a configuration of an electronic device according to an embodiment. Referring to FIG. 2, the electronic device 1 may include a communication unit 11, a signal input/output unit 12, a display 13, a user input unit 14, a storage 15 and a processor 17.

The configuration of the electronic device 1 will be described herein below. The electronic device 1 according to the present embodiment is a TV, but the electronic device 1 is not limited thereto and may be implemented as other various types of devices. The electronic device 1 may not be implemented as a display apparatus, in which case, the electronic device 1 may not include elements for displaying an image such as the display 13. For example, if the electronic device 1 is implemented as a set-top box, the electronic device 1 may output an image signal to an external TV through the signal input/output unit 12.

The communication unit 11 is a two-way communication circuit or interface including at least one of elements such as a communication module and communication chip corresponding to various types of wired and wireless communication protocols. In the case of a wired communication, the communication unit 11 may be connected to the cable 4 and communicate with the external device 2. The cable 4 may be in accordance with HDMI 2.1 standard. In such case, the communication unit 11 may receive from the external device 2 an HD video signal with a high bandwidth of up to 48 Gbps, e.g., 4K 120 Hz and 8K 60 Hz. However, the cable 4 is not limited to the HDMI 2.1 standard, and may include other cables in accordance with universal serial bus (USB) 3.1 standard or DisplayPort 1.4 standard. In the case of a wireless communication, the communication unit 11 may perform a high-speed wireless communication with the external device 2 according to various wireless communication standards such as 5th-generation (5G) communication, Wi-Fi, Wireless HD (WiHD), Wireless Gigabit Alliance (WiGig) and Bluetooth.

The signal input/output unit 12 may include a port to which the cable 4 is connected, e.g., a connector or a port according to a preset transmission standard such as HDMI 2.1 port, USB 3.1 port, DisplayPort 1.4, DVI port, and Thunderbolt. The signal input/output unit 12 may be integrally provided to the communication unit 11 depending on a design method.

The display 13 includes a display panel to display an image thereon. The display panel includes a non-emissive structure such as a liquid crystal display (LCD) or an emissive structure such as an organic light emitting diode (OLED). The display 13 may include additional elements depending on the structure of the display panel. For example, if the display panel is, the display 13 includes an LCD panel, a backlight unit for supplying light, and a panel driving circuit for driving liquid crystal of the LCD panel. However, if the electronic device 1 is implemented as a set-top box, the display 13 may be omitted.

The user input unit 14 includes a circuit relating to various types of input interfaces for a user to input information. The user input unit 14 may have various forms of structures depending on the type of the electronic device 1. For example, the user input unit 14 includes a mechanical or electronic button unit, touch pad and a touch screen installed in the display 13.

The storage 15 stores digitalized data therein. The storage 15 includes a non-volatile storage storing data therein regardless of power supply, and a volatile memory to which data is loaded to be processed by a processor 17 and which may not store data therein if power is not supplied. The storage includes a flash memory, hard-disc drive (HDD), a solid-state drive (SSD), read only memory (ROM), and the memory includes a buffer, random access memory (RAM), etc.

The storage 15 may store therein in advance a plurality of frames 3 transmitted by the external device 2 at the second transmission speed S2 before an image is displayed based on the received frames 3. In addition, the storage 15 may include a buffer 16, which may temporarily store at least one of a plurality of frames 3 to be played back, thereby mitigating a difference in the processing speed among elements of the electronic device 1.

The processor 17 may include at least one hardware processor implemented as a CPU, chipset, buffer, or circuit mounted on a printed circuit board, and may be implemented as a system on chip (SOC) depending on a design method. If the electronic device 1 is implemented as a display apparatus, the processor 17 includes modules corresponding to various processes such as a demultiplexer, decoder, scaler, audio digital signal processor (DSP), amplifier, etc. A part or all of the foregoing modules may be implemented as an SOC. For example, image processing modules such as a demultiplexer, decoder and scaler may be implemented as an image processing SOC, and the audio DSP may be implemented as an SOC and a separate chipset.

The processor 17 may control the communication unit 11 to receive a video signal including a plurality of frames 3 from the external device 2 at the second transmission speed S2 that is faster than the first transmission speed S1, and may control the storage 15 to store therein the plurality of frames 3 transmitted at the second transmission speed S2.

The processor 17 may identify features of a second frame to be played back after a first frame out of the plurality of frames 3 stored in the storage 15 and may control the display 13 to display the first frame based on the identified features of the second frame.

According to this embodiment, the processor 17 may control the display 13 to display an image based on the plurality of frames 3 prestored in the storage 15, thereby improving the quality of a watching environment and fully delivering the feeling of movement and sense of realism through an HD image.

However, the electronic device 1 may exclude part of the foregoing elements, or may further include, for example, a power source to supply power to each element, and a battery to store power supplied by the power source other than the foregoing elements.

Below, a configuration of the external device 2 will be described. The external device 2 may include a second communication unit 21, a second storage 22 and a second processor 23.

The second communication unit 21 is a two-way communication circuit or interface including at least one of elements such as a communication module and communication chip corresponding to various types of wired and wireless communication protocols. In the case of wired communication, the second communication unit 21 may transmit an HD video signal to the electronic device 1 through the cable 4 according to HDMI 2.1 standard. In the case of wireless communication, the second communication unit 21 may perform a high-speed wireless communication with the electronic device 1 according to various wireless communication standards such as 5G communication.

The second storage 22 performs operations of reading, recording, revising, deleting and renewing data under the control of the second processor 23. The second storage 22 includes various non-volatile and volatile memories such as a flash memory, HDD, SSD, buffer and RAM.

The second processor 23 may include at least one hardware processor implemented as a CPU, chipset, buffer, or circuit mounted on a printed circuit board, and may be implemented as an SOC depending on a design method. In particular, the second processor 23 may control the second communication unit 21 to transmit a video signal including a plurality of frames 3 to the electronic device 1 at the second transmission speed S2 that is faster than the first transmission speed S1.

By using at least one of machine learning, neural network or deep learning algorithm as rule-based or artificial intelligence algorithm, the processor 17 of the electronic device 1 may perform at least part of data analysis, processing, and result information generation to receive a video signal including the plurality of frames 3 at the second transmission speed S2 that is faster than the first transmission speed S1, or to store the plurality of frames 3 received from the external device 2 in the storage 15, identify features of a second frame to be played back after a first frame among the plurality of frames 3 stored in the storage 15, or display the first frame based on the identified features of the second frame.

For example, the processor 17 may perform functions of both a learning part and recognition part. The learning part may generate a learned neural network, and the recognition part may recognize (or infer, forecast, estimate and determine) data by using the learned neural network. The learning part may generate or renew the neural network. The learning part may obtain learning data to generate a neural network. For example, the learning part may obtain learning data from the storage 15 or from the second storage 22 or from other devices. The learning data may be those used for generating the neural network, and the neural network may be learned by using the learning data.

The learning part may perform a preprocessing operation with respect to the obtained learning data or may select data to be used for learning among a plurality of learning data, before causing the neural network to be learned by using learning data. For example, the learning part may process in a preset format or filter learning data or add/remove noise to/from learning data to process the learning data into data suitable for learning. The learning part may generate a neural network set to perform the foregoing operation by using the preprocessed learning data.

The learned neural network may include a plurality of neural networks (or layers). Nodes of the plurality of neural networks have weights, and the plurality of neural networks may be connected to each other so that an output value of a neural network is used as an input value of other neural networks. Examples of the neural networks may be Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN) and Deep Q-Networks models.

The recognition part may obtain target data to perform the foregoing operation. The target data may be obtained from the storage 15, from the second storage 22, or from other devices. The target data may be the data to be recognized by the neural network. The recognition part may perform a preprocessing operation with respect to the obtained target data or may select data to be used for recognition among a plurality of target data, before applying the target data to the learned neural network. For example, the recognition part may process in a preset format, filter target data or add/ remove noise to/from target data to process the target data into data suitable for recognition. The recognition part may obtain an output value output by the neural network by applying the preprocessed target data to the neural network. The recognition part may obtain a probability value or reliability value together with the output value.

Figure 3:
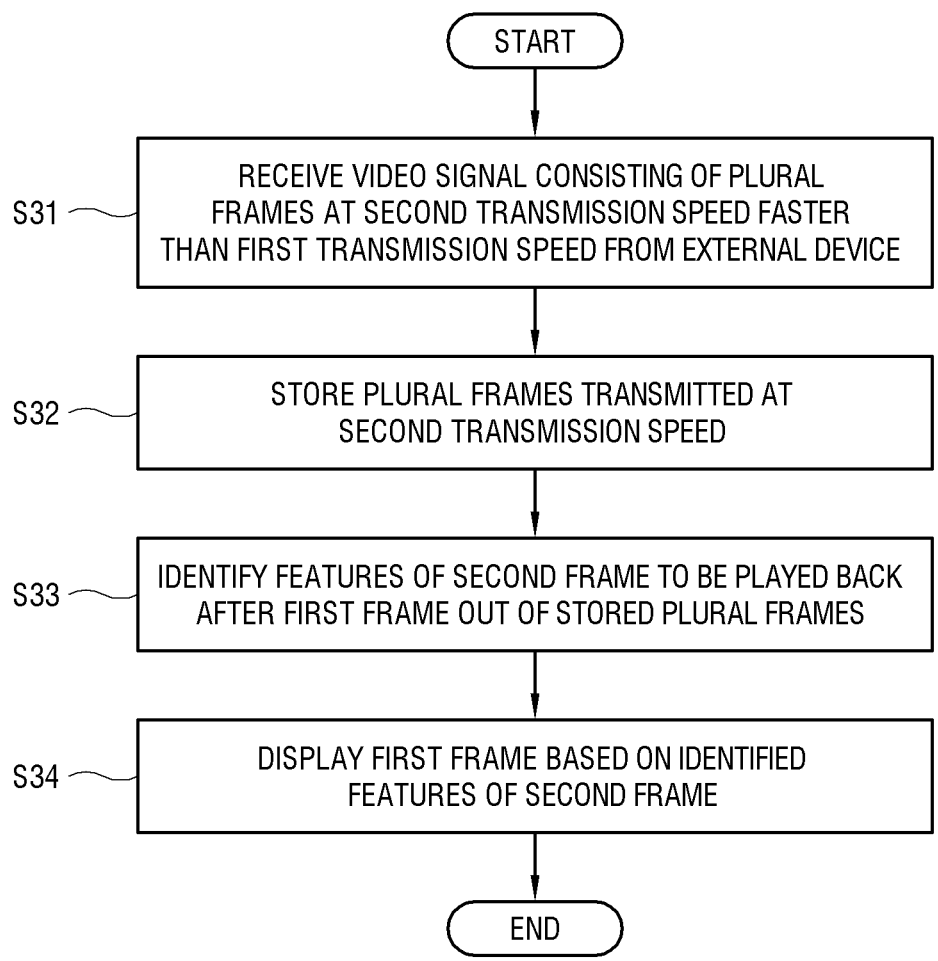
FIG. 3 is a flowchart illustrating an example of a control method of an electronic device according to an embodiment.

FIG. 3 is a flowchart illustrating an example of a control method of an electronic device according to an embodiment. Each operation in FIG. 3 may be executed by the processor 17 of the electronic device 1. As shown in FIG. 3, the processor 17 may receive a video signal including the plurality of frames 3 from the external device 2 at the second transmission speed S2 that is faster than the first transmission speed S1 (S31).

The processor 17 may store the plurality of frames 3 transmitted at the second transmission speed S2 (S32) in the storage 15.

The processor 17 may identify features of the second frame to be played back after the first frame among the plurality of frames 3 stored (S33).

The processor 17 may display the first frame based on the identified features of the second frame (S34).

As described above, according to an embodiment, the processor 17 may control the display 13 to display an image based on the plurality of frames 3 stored in advance, thereby improving the quality of a watching environment and fully delivering feeling of movement and sense of realism through an HD image.

Figure 4:
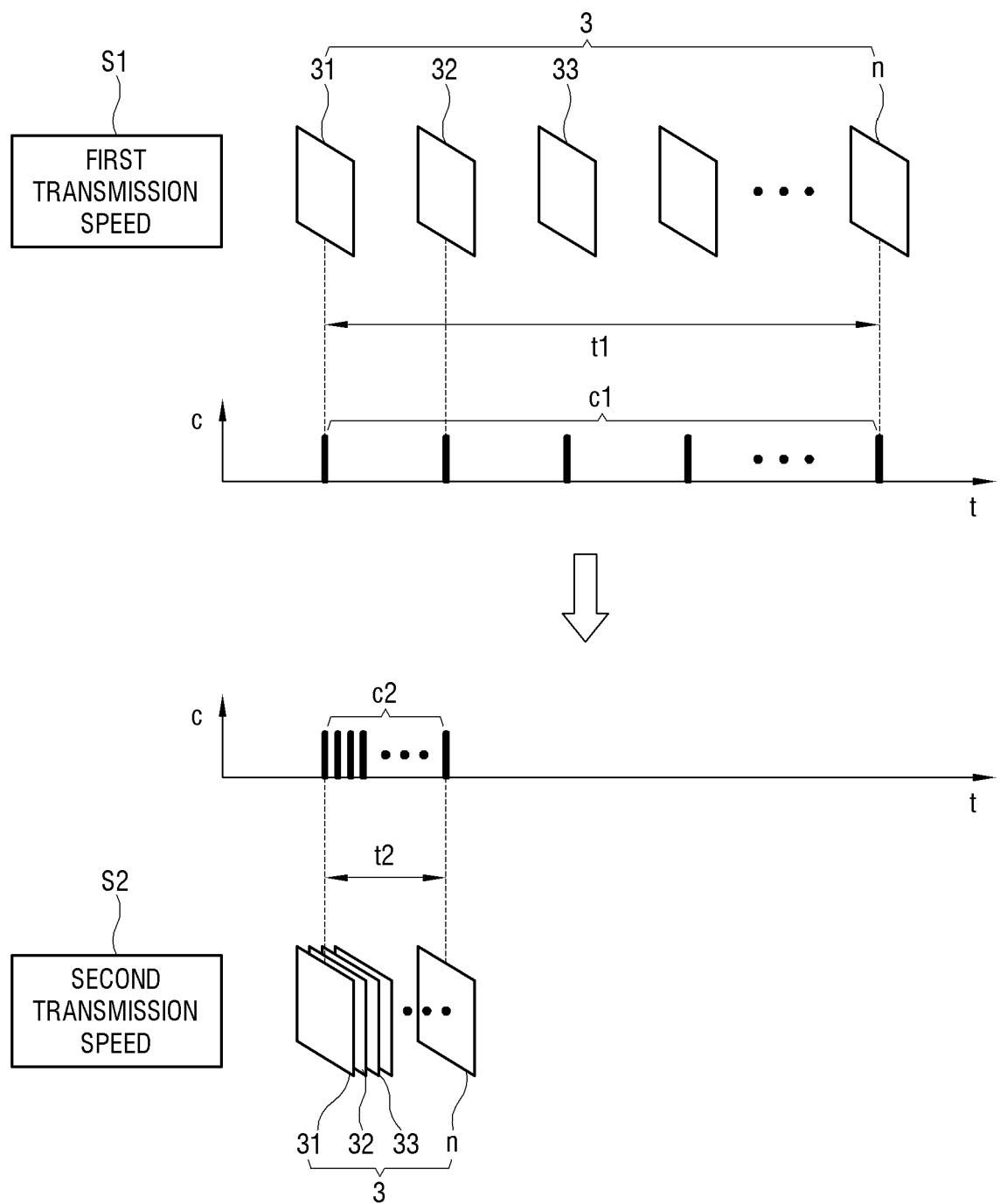
FIG. 4 is a schematic diagram illustrating an example of receiving a video signal at a second transmission speed that is faster than a first transmission speed in connection with an operation S31 in FIG. 3 according to an embodiment.

FIG. 4 is a schematic diagram illustrating an example of receiving a video signal at a second transmission speed faster than a first transmission speed in connection with an operation S31 in FIG. 3. A second processor 23 of the external device 2 may transmit a video signal including a plurality of frames 3 to the electronic device 1 at the first transmission speed S1.

More specifically, as shown in FIG. 4, the second processor 23 may transmit the plurality of frames 3 to the electronic device 1 at the first transmission speed S1 by transmitting the plurality of frames 3 to the electronic device 1 at a first clock frequency c1. In this embodiment, the number of the clock frequency and the number of frames correspond to each other on a 1:1 basis, but this is only an example. As another example, the number of the clock frequency and the corresponding number of frames may vary including the case where the clock frequency may be multiples of the number of frames, and vice versa.

The processor 17 of the electronic device 1 may control the display 13 to display a plurality of frames 3 transmitted at the first transmission speed S1 at a first clock frequency c1. The plurality of frames 3 may be displayed at a playback speed corresponding to the first transmission speed 1, e.g., at the speed corresponding to a vertical frequency.

The second processor 23 may vary a transmission speed of the plurality of frames 3. For example, as shown in FIG. 4, the second processor 23 may change the frequency to a second clock frequency c2, which is faster than the first clock frequency c1, and transmit the plurality of frames 3 to the electronic device 1 at the second transmission speed S2, thereby transmitting the plurality of frames 3 at the second transmission speed S2 faster than the playback speed.

The processor 17 of the electronic device 1 may receive the plurality of frames 3 at the second transmission speed S2, i.e. at the second clock frequency c2. In such case, as the processor 17 receives the plurality of frames 3 at the second transmission speed S2 that is faster than the playback speed corresponding to a vertical frequency of a video signal, the processor 17 may store the plurality of frames 3 into the storage 15 in advance.

Figure 5:
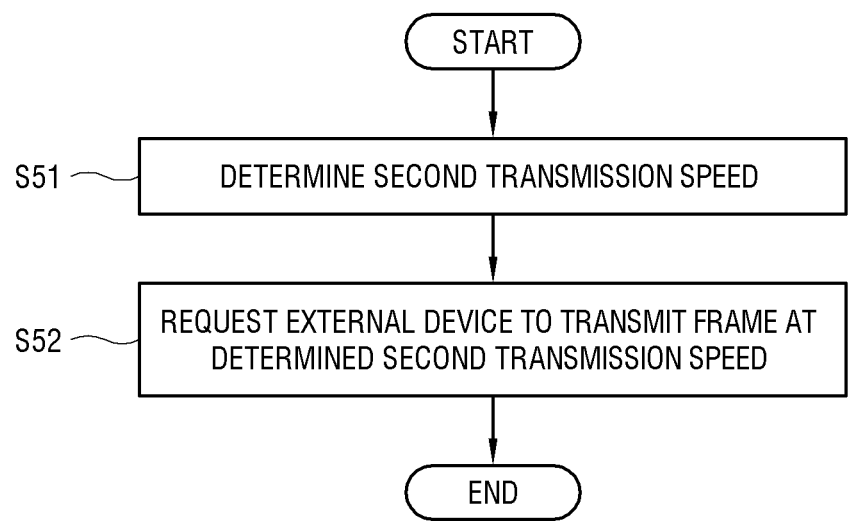
FIG. 5 is a flowchart illustrating an example of a control method of an electronic device that requests for transmission of a frame at a determined second transmission speed in connection with the operation S31 in FIG. 3 according to an embodiment.

FIG. 5 is a flowchart illustrating an example of a control method of an electronic device that requests for transmission of a frame at a determined second transmission speed in connection with the operation S31 in FIG. 3. Referring to FIG. 5, the processor 17 of the electronic device 1 may determine the second transmission speed S2 (S51).

Based on the determined second transmission speed S2, the processor 17 may request the external device 2 to transmit the plurality of frames 3 at the determined second transmission speed S2 (S52).

Figure 6:
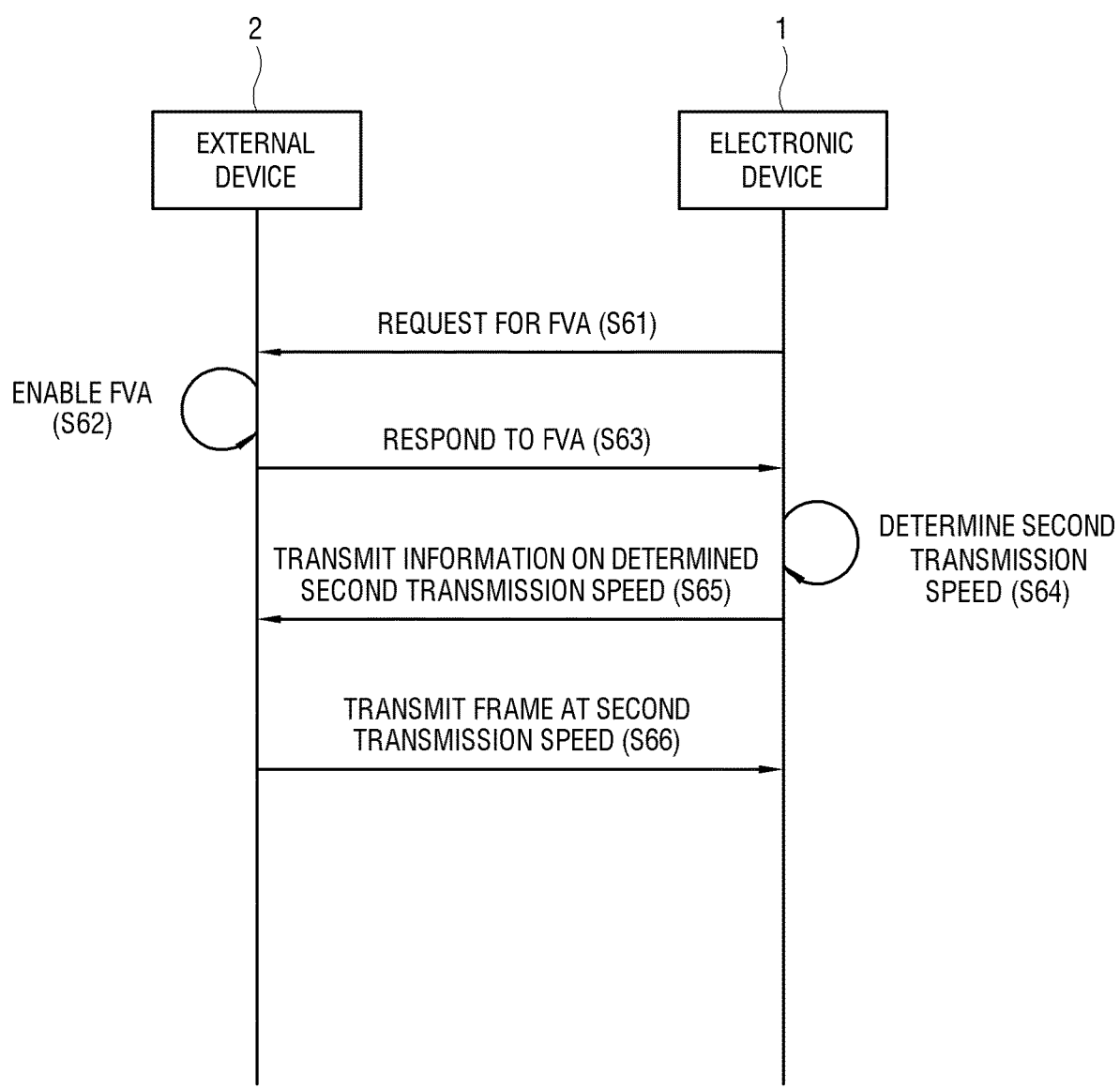
FIG. 6 is a sequence diagram illustrating an example of a process of determining a second transmission speed by an electronic device in connection with an operation S51 in FIG. 5 according to an embodiment.

FIG. 6 is a sequence diagram illustrating an example of a process of determining the second transmission speed by the electronic device in connection with an operation S51 in FIG. 5. Referring to FIG. 6, the processor 17 of the electronic device 1 may request the external device 2 to perform an FVA function (S61). The processor 17 may provide device information of the electronic device 1 through the request for FVA. The device information may include, for example, available picture quality, resolution, picture ratio of the display 13. The device information may be stored in the form of extended display identification data (EDID) in the storage 15. However, the device information may be provided through the means other than the FVA request. In other words, the second processor 23 of the external device 2 may obtain device information in various manners.

Also, the second processor 23 may enable the FVA function corresponding to the FVA request (S62), and may respond to the FVA request to the electronic device 1 (S63). The response to the FVA request may include information notifying that the FVA function has been enabled and is ready to be performed.

Based on receiving the FVA response from the external device 2, the processor 17 may determine the second transmission speed S2 (S64) and transmit information on the determined second transmission speed S2 to the external device 2 (S65) to request for transmission of the plurality of frames 3 at the determined second transmission speed S2.

For example, the processor 17 of the electronic device 1 may identify whether features of an image are to be adjusted. The processor 17 may identify whether features of an image, which is to be displayed, are to be adjusted. However, the embodiment is not limited thereto. The processor 17 may also identify whether features of an image, which is being displayed, are to be adjusted. If it is identified that the adjustment of features of an image is required, the processor 17 may determine the optimum second transmission speed S2 that is sufficient to secure a frame to be displayed subsequently in order to conduct estimation and analysis necessary for adjustment of features of an image. For example, the processor 17 may determine the second transmission speed S2 by considering resolution and size of an image, type of features of an image, the scope of adjustment of features of an image, etc. The processor 17 may determine the optimum second transmission speed S2 by considering the capacity of the storage 15 or the buffer 16. As another example, if a user determines that features of an image should be adjusted and inputs the second transmission speed S2 through the user input unit 14 to adjust the features of an image, the processor 17 may request the external device 2 to transmit data at the second transmission speed S2 by transmitting to the external device 2 information on the second transmission speed S2 based on a user input.

Accordingly, the second processor 23 may transmit to the electronic device 1 the plurality of frames 3 at the second transmission speed S2 as requested by the electronic device 1 based on information transmitted by the electronic device 1.

Figure 7:
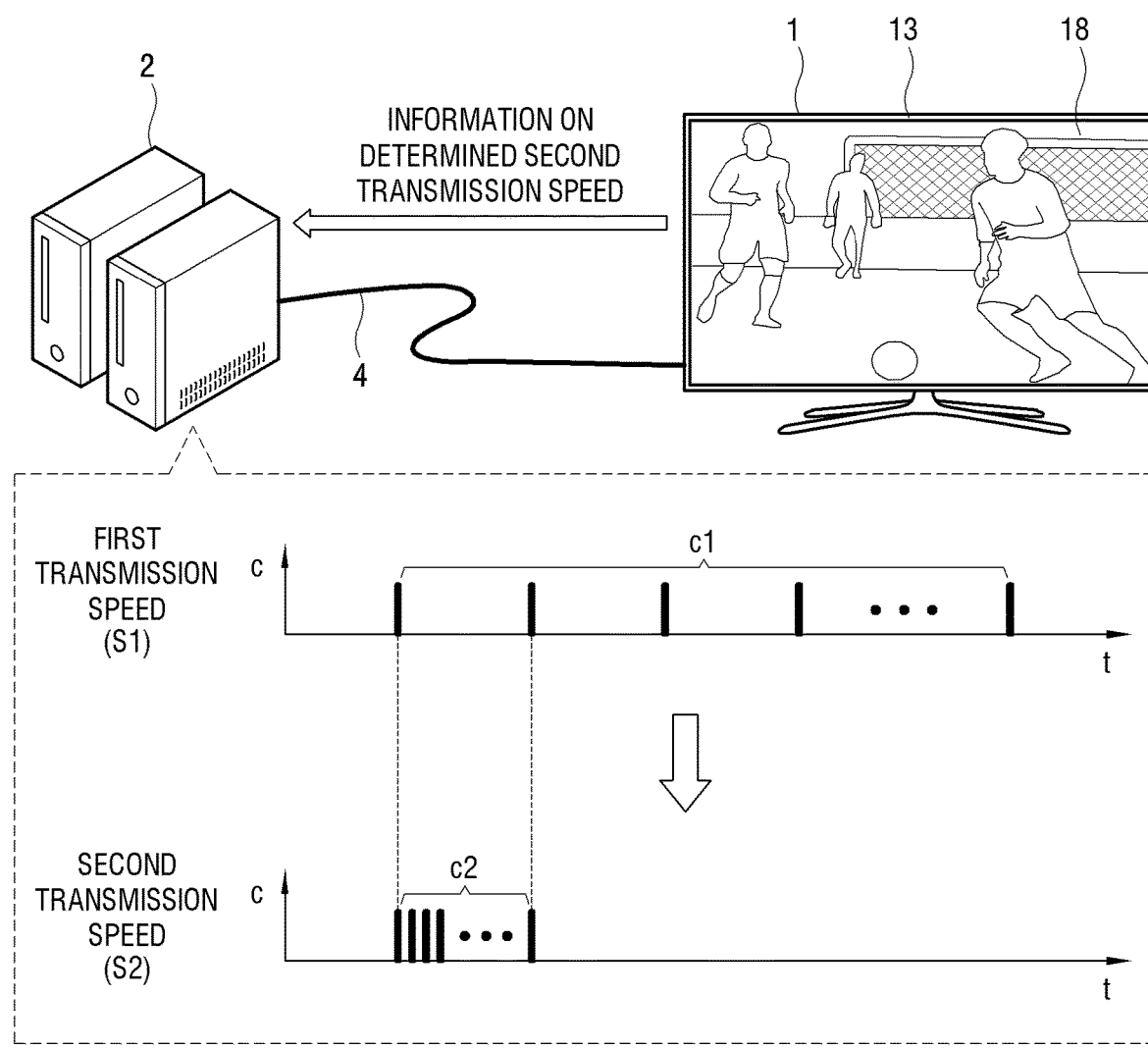
FIG. 7 is a schematic diagram illustrating an example of transmitting a frame based on the second transmission speed determined by an electronic device in connection with an operation S66 in FIG. 6 according to an embodiment.

FIG. 7 is a schematic diagram illustrating an example of transmitting a frame based on the second transmission speed determined by the electronic device in connection with an operation S66 in FIG. 6. Referring to FIG. 7, the processor 17 of the electronic device 1 may determine the second transmission speed S2 for the plurality of frames 3 according to the FVA function.

If the processor 17 transmits information on the determined second transmission speed S2 to the external device 2, the second processor 23 of the external device 2 may transmit the plurality of frames 3 to the electronic device 1 at the second transmission speed S2 as requested by the electronic device 1.

For example, if the processor 17 transmits to the external device 2 information on the second transmission speed S2 faster than the first transmission speed S1, the second processor 23 may transmit to the electronic device 1 a video signal including the plurality of frames 3 at the second clock frequency c2 faster than the first clock frequency c1 at the second transmission speed S2.

Figure 8:
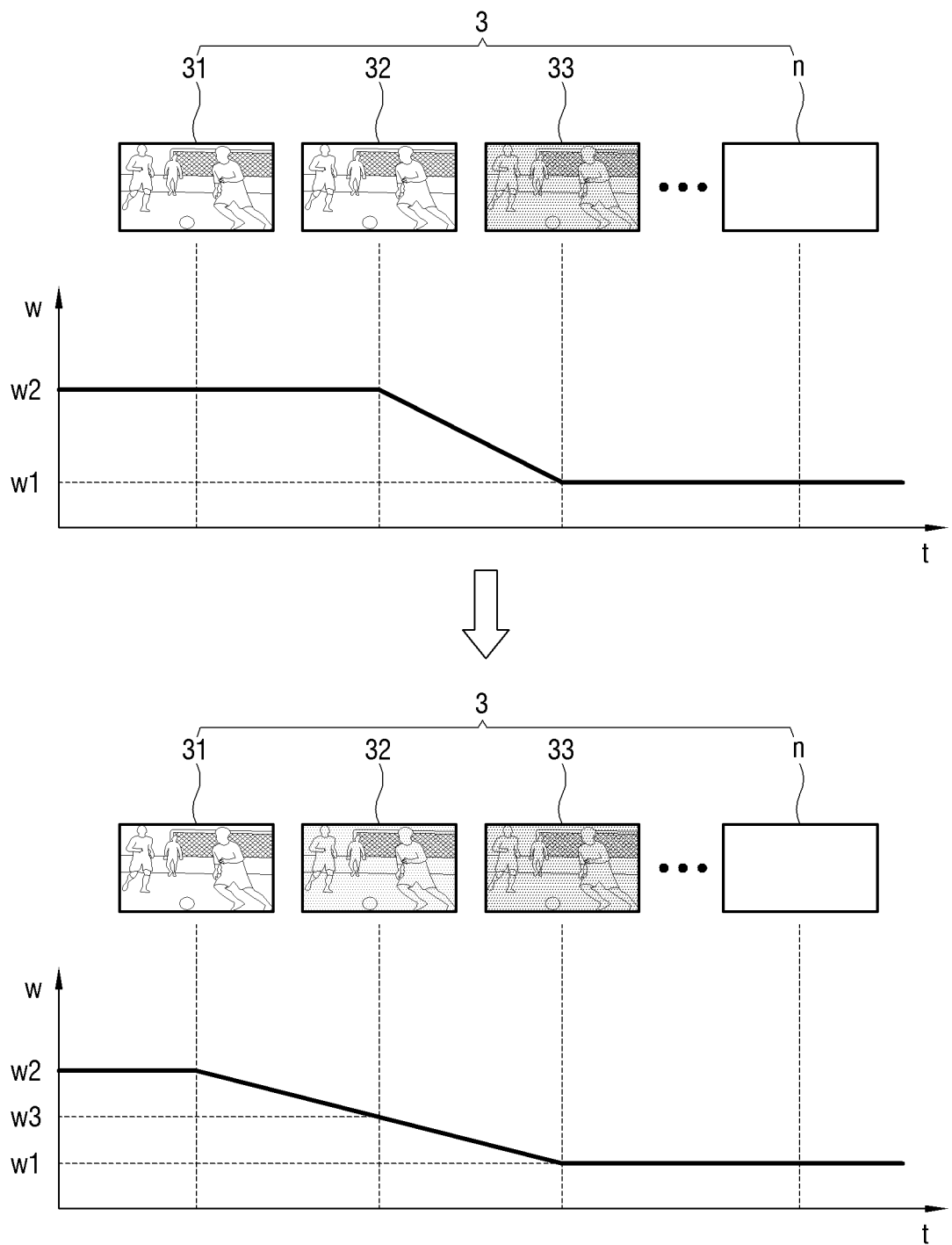
FIG. 8 is a diagram illustrating an example of identifying features of a second frame in connection with an operation S33 in FIG. 3 according to an embodiment.

FIG. 8 is a diagram illustrating an example of identifying features of a second frame in connection with an operation S33 in FIG. 3. As shown in FIG. 8, if a video signal includes a plurality of frames 3, the processor 17 of the electronic device 1 may receive the plurality of frames 3 at the second transmission speed S2 faster than the first transmission speed S1, and store the plurality of frames 3 received as above in advance.

An example of adjusting features of the second frame 32 will be described with reference to FIG. 8. With respect to the plurality of stored frames 3, the processor 17 may identify feature of a third frame 33 to be played back after a second frame 32, and may display the second frame 32 based on the identified features of the third frame 33. For example, if the identified feature of an image relates to brightness, the processor 17 may identify brightness of each of the plurality of frames 3. Specifically, the processor 17 may identify brightness of each of the plurality of frames 3 through each brightness value or a brightness graph showing a tendency of each brightness value of the plurality of frames 3.

As shown in FIG. 8, if it is identified that a brightness of the first frame 31 is maintained at a first brightness w2 until the second frame 32 and is changed to a second brightness w1 that has been drastically darkened starting from the third frame 33, the processor 17 may adjust a brightness of the second frame 32 to a third brightness w3, based on a difference between the first brightness w1 of the second frame 32 and the second brightness w2 of the third frame 33. For example, the adjusted third brightness w3 of the second frame may be an intermediate brightness between the first brightness w1 and the second brightness w2 of the third frame 33, and therefore, the difference in brightness between the second and third frames 32 and 33 is reduced, and thereby reducing the sharp change in brightness between the second frame 32 and the third frame 33. Here, the intermediate brightness may be determined based on an average value of the sum of the first brightness w1 and the second brightness w2. However, the intermediate brightness is not limited thereto.

As described above, the processor 17 may, with respect to the stored plurality of frames 3, identify features of the third frame 33 to be played back after the second frame 32, and may control the display 13 to display the second frame 32 based on the identified features of the third frame 33. As such, the processor 17 may prevent a sharp change in the features between the frames and processes the image so that a user's visual discomfort may be reduced, thereby improving the quality of a watching environment and fully delivering feeling of movement and sense of realism through an HD image.

Furthermore, in FIG. 8, the second frame 32 and the third frame 33 are adjacent to each other. However, identifying the features of the plurality of frames is not limited thereto. For example, there may be at least one frame between the second frame 32 and the third frame 33, and even in such case, a brightness of the at least one frame between the second frame 32 and the third frame 33 may be adjusted to reduce a difference in features between the second frame 32 and the third frame 33 so that the brightness between the second frame 32 and the third frame 33 may gradually change.

Based on not only the difference in features between the second frame 32 and the subsequent third frame 33, but also the difference in features between the second frame 32 and the preceding first frame 31, the second frame and frames subsequent to the second frame 32 may be determined and adjusted.

That is, the processor 17 may adjust features of the frames if there is a change in the features before and after the second frame 32, e.g., if a change in the features is a preset value or higher.

Figure 9:
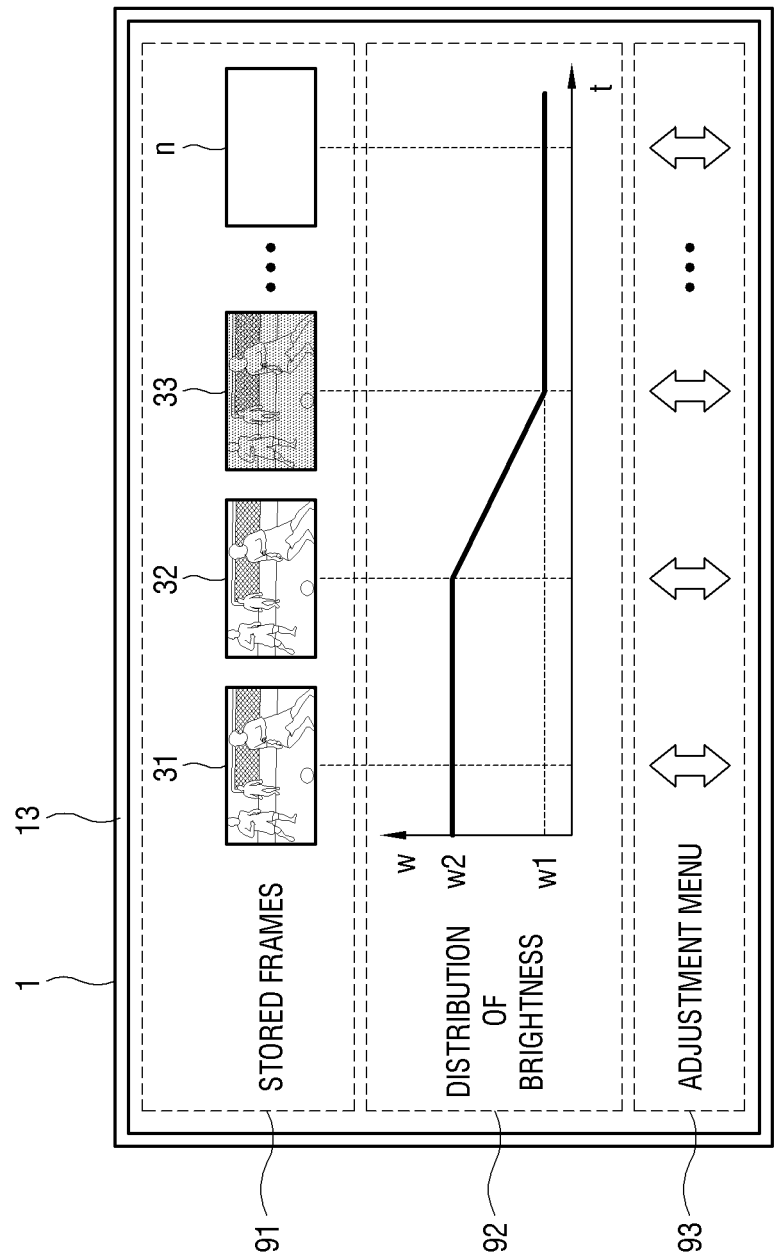
FIG. 9 is a diagram illustrating an example of adjusting features of a frame by an electronic device according to a user input according to an embodiment.

FIG. 9 illustrates an example of adjusting features of a frame by an electronic device according to a user input according to an embodiment. The processor 17 of an electronic device 1 may receive a plurality of frames 3 at a second transmission speed S2 faster than a first transmission speed S1 and may store the plurality of received frames 3 in advance.

As shown in FIG. 9, the processor 17 may display each of the plurality of stored frames 3 in a first region 91. The first region 91 may be an arbitrary region on a screen of a display 13. For example, if the plurality of frames 3 is stored in advance, the processor 17 may display information indicating that the plurality of frames has been stored in advance or prompting a user whether to display the plurality of stored frame 3. Upon receiving a user input for displaying the plurality of frames 3 stored in advance, the processor 17 may display each of the plurality of stored frames 3 in the first region 91.

The processor 17 may display information showing features of the plurality of stored frames 3 in a second region 92. The second region 92 may be an arbitrary region on a screen of the display 13. The second region 92 showing features of the plurality of stored frames 3 may include feature values or a graph showing a tendency of feature values of each of the plurality of frames 3.

The processor 17 may display in a third region 93 an adjustment menu for adjusting features of the plurality of stored frames 3. The adjustment menu 93 may be displayed in the form of a user interface. For example, if features of a second frame 32 are adjusted through the adjustment menu corresponding to the second frame 32, a picture quality of the second frame 32 displayed in the first region 91 is changed or feature values or graph of the second frame 32 displayed in the second region 92 may be changed, according to the adjusted features.

Figure 10:
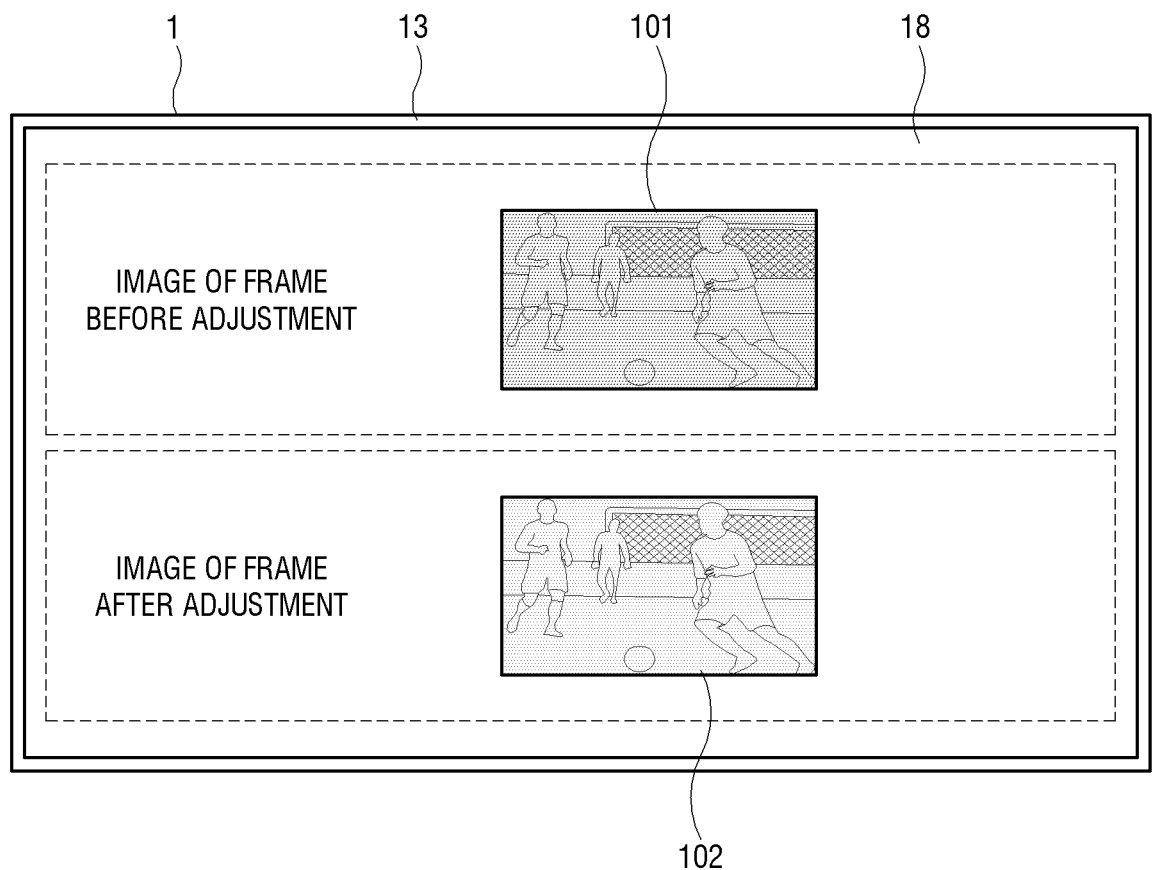
FIG. 10 is a diagram illustrating an example of displaying a frame before and after adjusting features of the frame by an electronic device according to an embodiment.

FIG. 10 illustrates an example of displaying a frame before and after adjusting features of the frame by the electronic device in FIG. 9 according to an embodiment. As described in connection with FIG. 9, the processor 17 may adjust features of the plurality of frames 3 stored in advance by using the adjustment menu displayed in the third region 93. For example, features of the second frame 32 may be adjusted through the adjustment menu corresponding to the second frame 32. In such case, it may be difficult to determine a difference in a picture quality before and after adjustment of features.

By considering the foregoing point, the processor 17 may display a second frame 101 before the adjustment of features and a second frame 102 after the adjustment of features, thereby allowing a user to easily view the difference in the picture quality before and after the adjustment of features.

Various embodiments disclosed herein may be implemented as software including one or more instructions stored in a storage medium that can be read by a machine such as the electronic device 1. For example, the processor 17 of the electronic device 1 may call and execute at least one of instructions stored in the storage medium. This enables a machine such as the electronic device 1 to be operated to perform at least one function according to the at least one instruction called and executed. The at least one instruction may include code generated by a compiler or code that may be executed by an interpreter. The machine-readable storage medium may be provided in the form of a non-transitory storage medium. The term 'non-transitory' means that the storage medium is tangible and that no signal (e.g., electromagnetic waves) is included. The term 'non-transitory' does not classify the case where data are stored in the storage medium semi-permanently and the case where data are temporarily stored in the storage medium.

For example, methods according to various embodiments disclosed herein may be included in a computer program product. The computer program product may be traded between a seller and a buyer. The computer program product may be distributed in the form of a machine-readable storage medium (e.g., CD-ROM), or may be distributed (e.g., downloaded or uploaded) online through an application store (e.g., Play Store™) or directly between two user devices (e.g., smart phones). In the case of an online distribution, at least part of the computer program product may be at least temporarily stored or generated in a machine-readable storage medium such as a manufacturer's server, an application store's server or relay server.

Accordingly, an electronic device and a control method thereof which improves a quality of watching environment and delivers feeling of movement and sense of realism through an HD image by transmitting an HD video signal at a variable transmission speed may be provided.

Although the embodiments have been shown and described above, it will be appreciated by those skilled in the art that changes may be made in these embodiments without departing from the principles and spirit of the disclosure, the scope of which is defined in the appended claims and their equivalents.

What is claimed is:

1. An electronic device comprising:
   a storage;
   a display;
   a communication interface configured to communicate with an external device to receive, from the external device, a video signal including a plurality of frames at a first transmission speed; and
   a processor configured to:
      control the communication interface to receive the plurality of frames and store the plurality of frames in the storage,
      identify features of a second frame to be played back after a first frame among the plurality of frames,
      adjust features of the first frame based on the identified features of the second frame, and
      control the display to display the first frame based on the adjusted features.

2. The electronic device according to claim 1, wherein the first transmission speed is faster than a second transmission speed corresponding to a vertical frequency of the video signal.

3. The electronic device according to claim 1, wherein the processor is further configured to control the communication interface to receive the plurality of frames at the first transmission speed by increasing a clock frequency.

4. The electronic device according to claim 1, wherein the processor is further configured to determine the first transmission speed, and transmit a request to the external device to transmit the plurality of frames at the determined first transmission speed.

5. The electronic device according to claim 1, wherein the processor is further configured to adjust features of the first frame to reduce a difference between the features of the first frame and the features of the second frame.

6. The electronic device according to claim 1, wherein, based on at least one frame existing between the first frame and the second frame, the processor is further configured to adjust the features of the first frame and features of the at least one frame so that the features of the first frame and the features of the at least one frame are gradually changed to the features of the second frame.

7. The electronic device according to claim 1, wherein the processor further configured to adjust the features of the first frame based on a change between the features of a third frame before the second frame being a preset value or higher.

8. The electronic device according to claim 1, wherein the features of each of the plurality of frames comprises at least one of brightness, saturation, hue, noise, motion vector, distribution of frequency or histogram.

9. The electronic device according to claim 1, wherein the processor is further configured to control the display to display information for adjusting a picture quality based on the features of the second frame.

10. The electronic device according to claim 9, further comprising a user input interface for receiving a user input, wherein the processor is further configured to receive, through the user input interface, a user input for adjusting the picture quality of the second frame, and control the display to display the second frame with the adjusted picture quality according to the received user input.

11. A control method of an electronic device, the control method comprising:
   receiving, from an external device, a video signal including a plurality of frames at a first transmission speed;
   storing the plurality of frames transmitted at the first transmission speed;
   identifying features of a second frame to be played back after a first frame among the plurality of frames;
   adjusting features of the first frame based on the identified features of the second frame; and
   displaying the first frame based on the adjusted features of the second frame.

12. The control method according to claim 11, wherein the first transmission speed is faster than a second transmission speed corresponding to a vertical frequency of the video signal.

13. The control method according to claim 11, wherein the receiving further comprises receiving the plurality of frames at the first transmission speed by increasing a clock frequency.

14. The control method according to claim 11, further comprising:
determining the first transmission speed; and
transmitting a request to the external device to transmit the plurality of frames at the determined first transmission speed.

15. The control method according to claim 11, wherein the displaying the first frame comprises adjusting the features of the first frame to reduce a difference between the features of the first frame and the features of the second frame.

16. The control method according to claim 11, further comprising:
based on at least one frame existing between the first frame and the second frame, adjusting the features of the first frame and features of the at least one frame so that features of the first frame and the features of the at least one frame are gradually changed to the features of the second frame.

17. The control method according to claim 11, wherein the displaying the first frame further comprises adjusting the features of the first frame based on a change between the features of a third frame before the second frame being a preset value or higher.

18. The control method according to claim 11, wherein the features of each of the plurality of frames comprises at least one of brightness, saturation, hue, noise, motion vector, distribution of frequency or histogram.

19. The control method according to claim 11, wherein the displaying the first frame further comprises displaying information for adjusting a picture quality based on the features of the second frame.

20. A non-transitory computer readable recording medium storing a computer program comprising computer-readable code that performs a control method of an electronic device, the control method of the electronic device comprising:
receiving, from an external device, a video signal including a plurality of frames at a first transmission speed;
storing the plurality of frames transmitted at the first transmission speed;
identifying features of a second frame to be played back after a first frame among the plurality of frames;
adjusting features of the first frame based on the identified features of the second frame; and
displaying the first frame based on the adjusted features.

* * * * *